Figure 1:
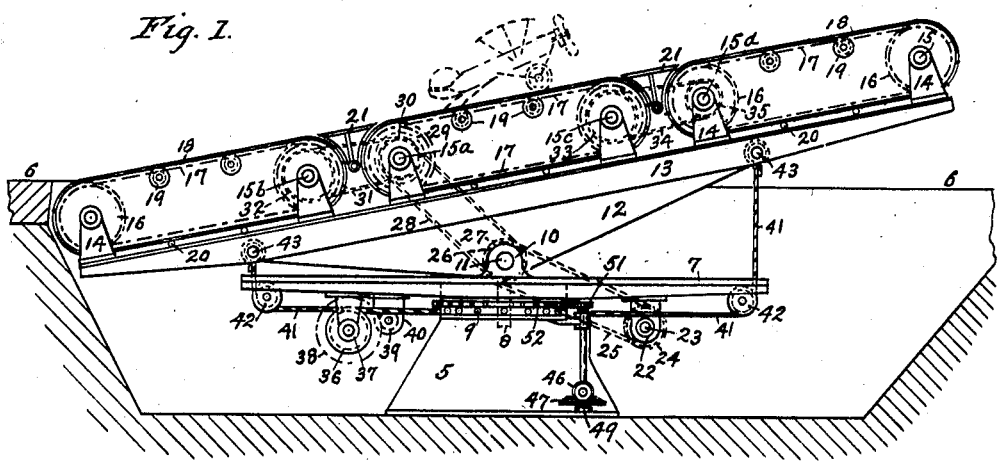

Sept. 22, 1931.  W. B. HARISON  1,824,346
AEROPLANE STATION
Filed Sept. 22, 1928

Inventor
William B. Harison
By his Attorney
Wm Bodge

Patented Sept. 22, 1931

1,824,346

UNITED STATES PATENT OFFICE

WILLIAM BEVERLEY HARISON, OF GARDEN CITY, NEW YORK

AEROPLANE STATION

Application filed September 22, 1928. Serial No. 307,626.

The present invention relates to an aeroplane station mechanically arranged in a comparatively small operating space to facilitate the reception and the discharge of flying planes.

The objects of the invention include the provision of a movable platform, preferably comprising a plurality of endless carriers jointly supported on a common frame; means for gradually accelerating the speed of the carrier in one direction to retard the landing action of the plane, and in the opposite direction to facilitate its taking-off movement; also means for changing the inclination of the carrier and thereby effecting an increase in retarding action during landing, and a corresponding increase in lifting movement when taking off; and also means to turn the carrier horizontally about a vertical axis in the direction of the wind, if any, to further facilitate the landing and taking-off movements.

For further comprehension of the invention, and of the objects and advantages thereof, reference is had to the following description and accompanying drawings, and to the appended claims in which the various features of the invention are more particularly pointed out.

Figure 2:
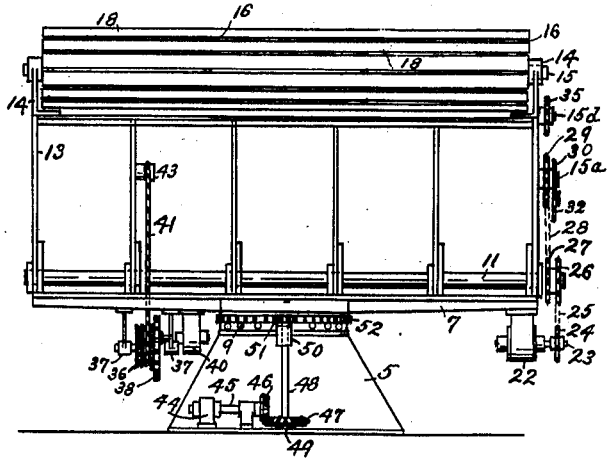

Referring to the drawings in which similar characters of reference designate like parts throughout the several views:

Figure 1 of the drawings illustrates a side elevational view embodying my invention, and Figure 2 is an end elevational view of the same.

Numeral 5 of the drawings designates a base supported below the ground line 6, and mounted for horizontal turning movement upon the base is a table 7, provided with a central pivot pin 8 and a series of anti-friction supporting balls 9. The table 7 is also provided with bearings 10, in which is mounted the shaft 11, and upon the latter the frame 12 is pivotally supported for adjustment to different inclinations.

Fixed upon the upper members 13 of the frame 12 are a series of bearings 14, in which are rotatably supported a plurality of carrier-wheels 16, indicated by broken lines. Endless carrier members 17, also shown by broken lines, and preferably comprising well-known silent, high-speed link-chains, are mounted upon the wheels 16. Conventional attachment links, not shown, are provided for the chains for connecting the transverse carrier-bars 18, and for the support of the carrier members between the wheels 16, the idler wheels 19 are disposed below the upper runs of the several carriers, and below the lower runs thereof the smaller idler rolls 20 are employed. Between the adjacent upper runs of the several carriers, fixed bridge members 21 are provided, the same being secured to the upper members 13 of the frame in any approved manner. The relatively fixed bridges afford a surface alined with the working faces of the carriers over which the planes may pass in a comparatively even manner.

For driving the several carriers in a successively accelerated manner, a motor 22 is fixed to the lower surface of the table 7, the driving shaft 23 of the motor having a wheel 24, transmitting power through chain 25 to a wheel 26, the latter having an extended hub loosely mounted on the outer end of the pivotal shaft 11, a second wheel 27 being fixed to the hub of the wheel 26 and in turn transmitting its power by the chain 28 to a driving wheel 29, fixed upon a driving shaft 15a of the central carrier. From the latter shaft a relatively small wheel 30 drives by a chain 31 to a relatively large wheel 32, fixed upon the adjacent carrier shaft 15b, thus causing a reduction in the speed of the latter carrier. Also upon the shaft 15c of the central carrier is mounted a relatively large wheel 33 which drives by a chain 34 to a relatively small wheel 35, fixed upon the adjacent carrier shaft 15d, thus causing the latter carrier to be driven at a relatively higher speed. By suitably changing the proportion of the several driving wheels the desired successive acceleration of the carriers may readily be obtained. By changing the speed of the motor, a corresponding change may be made in the velocity of the carriers, and for reversing the latter's direction of movement, a similar reversal of the motor may be made, the several driving wheels of the carriers being herein shown by dotted lines.

For adjusting the inclination of the carrier frame 12, a drum 36 is provided and mounted in bearings 37, fixed to the lower side of the table 7, the drum being provided with a relatively large driving gear 38, actuated by a pinion gear 39, fixed to the driving shaft of the motor 40, the latter being likewise secured to the lower side of the table. Passing around the drum 36 is a cable 41, the opposite ends of which are led around the idler wheels 42 and secured to the opposite ends of the frame at the points 43, the idler wheels being loosely mounted on the lower side of the table 7 as shown. By the rotation of the motor 40 in opposite directions, the inclination of the frame and carriers may be readily adjusted. The cable connections 43 of the frame are equally disposed at opposite sides of its pivotal center, and a downward movement at one cable point of the frame will cause the latter to turn about its pivot point and effect an equal lifting movement at the opposite cable point, thus acting to equalize the tension at opposite ends of the cable leading from the driving drum 36 and operating to hold the frame against undue movement or vibration from moving loads thereon at all variable points of inclination.

The means herein shown for horizontally turning the table 7 and the connected frame and carrier, include a motor 44 supported on the base 5 and carrying a horizontal shaft 45, the latter having at one end a bevel pinion 46, engaging a bevel gear 47, fixed adjacent the lower end of a vertical shaft 48, the lower end of the latter shaft being carried in a step-bearing 49 of the base, while at its upper end the shaft is mounted in a bearing 50 of the base. Upon the upper end of the vertical shaft 48, is fixed a gear 51, which engages for relative rotation the gear 52, fixed to the lower side of the table 7. By the rotation of the motor 44 in opposite directions the table and superposed load may be turned about its vertically disposed pivot pin 8.

For the landing of a plane, the platform carrier is adjusted to the desired inclination by the motor 40, and horizontally turned to a direction opposed to possible wind pressure by the motor 44; and by the motor 22 the carriers of the platform are rotated in a downward direction in opposition to the advancement of the plane, the momentum of the latter up the inclined platform being quickly arrested by the gradually accelerated movements of the several carriers through frictional resistance against the tail drag and the wheel-brake action of the plane; and by the continued rotation of the carriers the plane may be landed upon the ground level 6.

For taking off or elevating a plane in opposition to possible wind pressure, the platform carrier is similarly positioned as for landing, except that the carriers are rotated in the opposite manner, or in the direction in which the plane is advancing. As thus operated the frictional resistance between the quickly moving carriers and the superposed plane, will serve to quickly pick up the speed of and elevate the latter in a comparatively short distance of the carriers run.

While I have shown the platform carrier of the aeroplane station as supported below the ground level, it will be obvious that the same may be constructed upon an elevated structure both on land and water, and be readily operated to receive and discharge planes in a comparatively small working space. As compared with the large field commonly required for the present method both of landing and taking-off, the advantages offered by my improved device will be clearly evident.

Claims

1. An aeroplane station including a movable platform, a supporting frame therefor extending lengthwise in the direction of movement thereof, a table, pivotal means supporting said frame upon said table, cable connection points on said frame equally disposed at opposite sides of its pivotal center, a driving drum rotatably mounted on said table, and cable connections leading from said drum to the connection points of said frame.

2. An aeroplane station including a movable platform, a supporting frame therefor extending lengthwise in the direction of movement thereof, a table, pivotal means supporting said frame upon said table, cable connection points on said frame equally disposed at opposite sides of its pivotal center, a driving drum rotatably mounted on said table, cable connections leading from said drum to the connection points of said frame, and means for rotating said table.

3. An endless carrier having pivoted supporting means adapted to change the inclination of said carrier, cable connections engaging said pivoted support at opposite sides of said pivot center and at equal distances therefrom, and a driving drum engaging said cable between said connections and disposed to afford equal cable tensions at opposite sides thereof.

Signed at New York in the county of New York and State of New York this 20th day of September A. D. 1928.

WILLIAM BEVERLEY HARISON.